United States Patent [19]

Oliver

[11] Patent Number: 4,634,411

[45] Date of Patent: Jan. 6, 1987

[54] ENDLESS POWER TRANSMISSION BELT CONSTRUCTION AND METHOD OF MAKING THE SAME

[75] Inventor: Larry R. Oliver, Springfield, Mo.

[73] Assignee: Dayco Corporation, Dayton, Ohio

[21] Appl. No.: 637,182

[22] Filed: Aug. 2, 1984

Related U.S. Application Data

[63] Continuation-in-part of Ser. No. 328,166, Dec. 7, 1981, abandoned.

[51] Int. Cl.⁴ .............................................. F16G 1/08
[52] U.S. Cl. .................................. 474/244; 474/271; 474/264
[58] Field of Search .............. 474/240, 242, 244, 264, 474/265, 250, 237, 268, 271; 156/137, 139, 140

[56] References Cited

U.S. PATENT DOCUMENTS

| | | | |
|---|---|---|---|
| 1,113,746 | 10/1914 | Bohlman | 474/242 |
| 1,883,821 | 10/1932 | Reeves | 474/244 |
| 2,194,833 | 3/1940 | Nassimbene | 474/250 |
| 2,338,447 | 1/1944 | Lenart et al. | 474/271 |
| 2,348,522 | 5/1944 | Case | 474/265 |
| 2,514,429 | 7/1950 | Waugh | 474/265 |
| 3,068,710 | 12/1962 | Beckadolph et al. | 474/205 |
| 3,164,026 | 1/1965 | Terhune | 474/264 |
| 3,334,524 | 8/1967 | Chalk | 474/205 |
| 3,545,273 | 12/1970 | Marzocchi et al. | 474/271 |
| 3,580,767 | 5/1971 | Barnes et al. | 474/205 |
| 3,673,883 | 7/1972 | Adams | 474/264 |
| 3,863,516 | 2/1975 | Fisher et al. | 474/264 |
| 3,949,621 | 4/1976 | Beusink et al. | 474/242 X |
| 4,010,655 | 3/1977 | Pollard | 474/264 |
| 4,051,740 | 10/1977 | Narang | 474/242 |
| 4,052,909 | 10/1977 | Warner et al. | 474/239 |
| 4,078,443 | 3/1978 | Warner et al. | 474/264 |
| 4,108,012 | 8/1978 | Warner et al. | 474/242 |
| 4,177,687 | 12/1979 | Russ, Sr. | 474/242 |
| 4,365,965 | 12/1982 | Russ, Sr. | 474/244 |

FOREIGN PATENT DOCUMENTS 5628 of 1910 United Kingdom ................ 474/242

Primary Examiner—Stephen J. Novosad
Assistant Examiner—Thuy M. Bui
Attorney, Agent, or Firm—Joseph V. Tassone

[57] ABSTRACT

An endless power transmission belt construction having power transmitting contact faces and method of making the same are provided, the belt construction comprising an axial tensioning unit, a plurality of lateral stiffening units carried by the tensioning unit, and friction material carried by the units, the tensioning unit and the stiffening units being formed of material that provides an axial and lateral stiffness in excess of that normally provided by polymeric friction material that normally forms the main body of a belt construction that is reinforced with such a tensioning unit and stiffening units. The friction material has a first portion thereof disposed on the units to define the contact faces thereof and has a remaining portion thereof disposed on the units to at least assist in securing the first portion to the units, the thickness of the first portion of the friction material being relatively thin and the thickness of the remaining portion being no thicker than the thickness of the first portion whereby a substantially large amount of the belt construction comprises the material of the units and a substantially small amount of the belt construction comprises the friction material.

22 Claims, 9 Drawing Figures

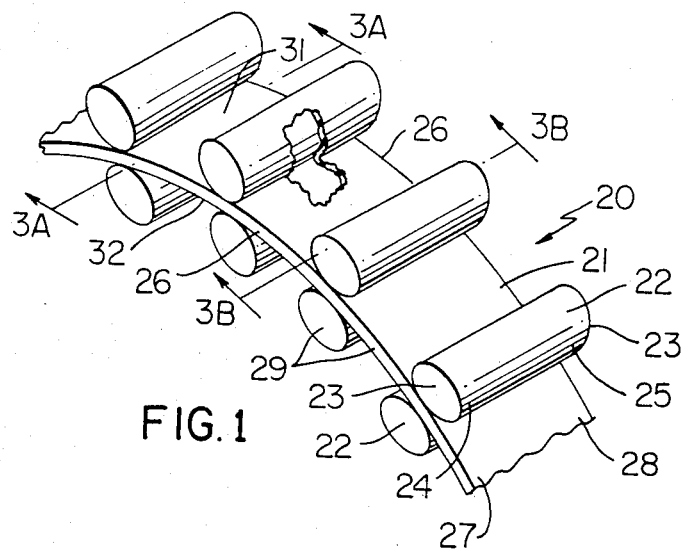
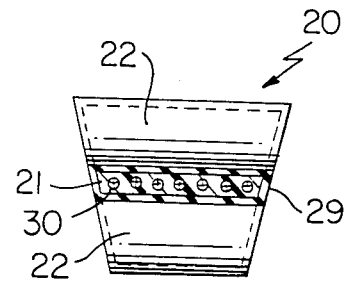
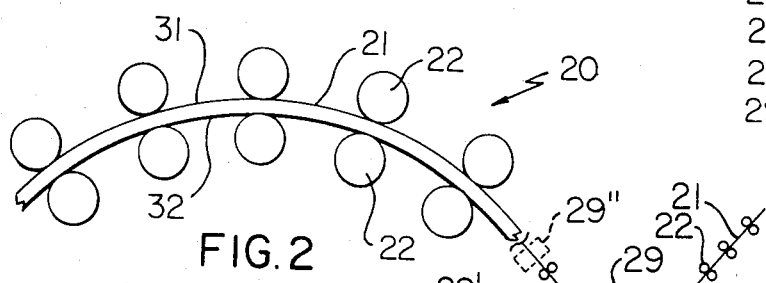
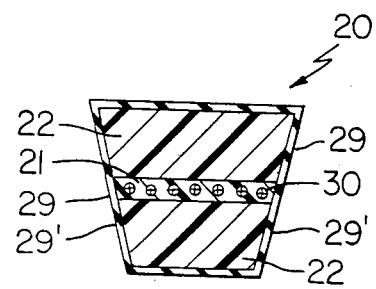
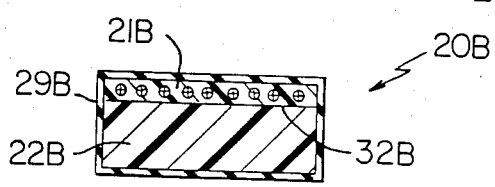
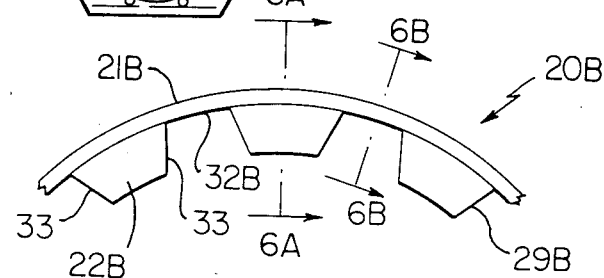
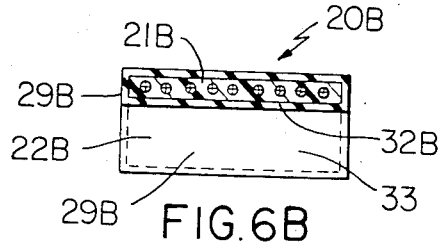
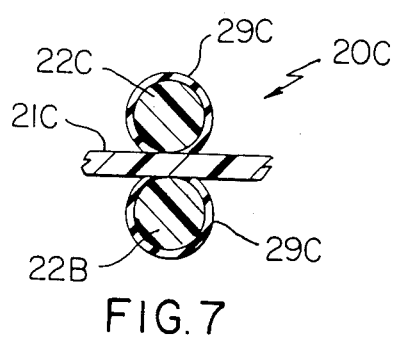
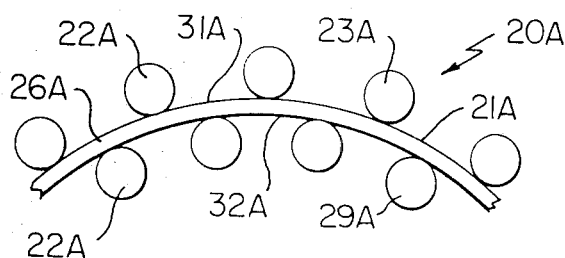

ENDLESS POWER TRANSMISSION BELT CONSTRUCTION AND METHOD OF MAKING THE SAME

CROSS REFERENCE TO RELATED PATENT APPLICATION

This application is a continuation-in-part patent application of its parent patent application, Ser. No. 328,166, filed Dec. 7, 1981 now abd.

BACKGROUND OF THE INVENTION

1. Field of the Invention

This invention relates to an imporved endless power transmission belt construction as well as to a method of making such a belt construction.

2. Prior Art Statement

It is known in the art to provide an endless power transmission belt construction having power transmitting contact faces and comprising an axial tensioning means, a plurality of lateral stiffening means carried by the tensioning means, and friction material carried by the means, the tensioning means and the stiffening means being formed of material that provides an axial and lateral stiffness in excess of that normally provided by polymeric friction material that normally forms the main body of a belt construction that is reinforced with such a tensioning means and stiffening means and the friction material having a first portion thereof disposed on the means to define the contact faces thereof and having a remaining portion thereof disposed on the means to at least assist in securing the first portion to the means.

For example, see the following two U.S. Patents:
(1) U.S. Pat. No. 4,078,443—Warner et al
(2) U.S. Pat. No. 4,108,012—Warner et al It appears that the power transmission belts of item (1) above have axial tensioning means and lateral stiffening means, either formed as a homogeneous one-piece structure or separately and subsequently secured together, and being embedded within a polymeric friction material that normally forms the main body of the belt constructions while the tensioning means and stiffening means reinforce the same whereas it appears that the belt constructions in item (2) above each has the lateral stiffening means formed separate from the axial tensioning means while being secured thereto.

It is also known to provide metallic lateral stiffening means for a belt construction.

For example, see the following U.S. Patent:
(3) U.S. Pat. No. 4,177,687—Russ, Sr.

It is also known to provide an all metallic belt.
For example, see the following U.S. Patent:
(4) U.S. Pat. No. 3,949,621—Beusink et al

SUMMARY OF THE INVENTION

It is one feature of this invention to provide an improved endless power transmission belt construction having power transmitting contact faces.

It is believed, according to the teaching of this invention, that an endless power transmission belt construction can be provided by merely providing a "backbone structure" of an axial tensioning means and a plurality of lateral stiffening means carried by the tensioning means and with the means being formed of material that provides an axial and lateral stiffness in excess of that normally provided by polymeric friction material that normally forms the main body of a belt construction that is reinforced with such a tensioning means and stiffening means, such as in the aforementioned U.S. Pat. No. 4,078,443, to Warner et al, and then utilizing such "backbone structure" as the main body of the belt construction itself by merely applying a relatively thin layer of the friction material to the "backbone structure" at the power transmitting contact faces of the belt construction so that the friction material defines the contact faces, and at other parts of the "backbone structure" to at least assist in securing the friction material thereto whereby the "backbone structure" defines substantially all of the material of the belt construction.

Thus, it is believed that while the U.S. Pat. Nos. 4,078,443 and 4,108,012, to Warner et al, provide a "backbone structure" the patentees did not appreciate the fact that the "backbone structure" could be utilized as the belt construction itself and that the friction material need not form the main body part of the belt construction as in such patents and that the friction material need only be applied in a relatively thin layer to the "backbone structure" at the contact faces of the power transmission belt to define those contact factes thereof and do to other parts to secure the layers thereto whereby the "backbone structure" defines substantially all the material of the belt construction as provided by applicant's invention in order to reduce the heat of operation of the resulting belt construction as will be hereinafter set forth.

For example, one embodiment of this invention provides an endless power transmission belt construction having power transmitting contact faces and comprising an axial tensioning means, a plurality of lateral stiffening means carried by the tensioning means whereby the tensioning means and the stiffening means comprise a self-contained unit, and friction material carried by the stiffening means and the tensioning means, the tensioning means and the stiffening means being formed from a material that provides an axial and lateral stiffness for the belt construction and thereby provides a backbone structure for the belt construction with the backbone structure comprising the self-contained unit. The friction material has a first portion thereof disposed on the backbone structure to define the contact faces and has a remaining portion thereof disposed on the backbone structure to at least assist in securing the first portion to the backbone structure. The backbone structure as the self-contained unit thereof had been dipped into the friction material while the friction material is in a liquid condition so as to have the thickness of the first portion of the friction material to be relatively thin and the thickness of the remaining portion to be no thicker than the thickness of the first portion whereby a substantially large amount of the belt construction comprises the backbone structure and a substantially small amount of the belt construction comprises the friction material.

Accordingly, it is an object of this invention to provide an improved endless power transmission belt construction having one or more of the novel features of this invention as set forth above or hereinafter shown or described.

Another object of this invention is to provide a method of making such an endless power transmission belt construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view of one embodiment of the endless power transmission belt construction of this invention.

FIG. 2 is a fragmentary side view of the belt construction of FIG. 1, FIG. 2 illustrating schematically one step in the method of this invention for making the belt construction of FIG. 1.

FIG. 3A is an enlarged cross-sectional view taken on line 3A—3A of FIG. 1.

FIG. 3B is an enlarged cross-sectional view taken on line 3B—3B of FIG. 1.

FIG. 4 is a fragmentary side view of another embodiment of the belt construction of this invention.

FIG. 5 is a fragmentary side view of another embodiment of the belt construction of this invention.

FIG. 6A is an enlarged cross-sectional view taken on line 6A—6A of FIG. 5.

FIG. 6B is an enlarged cross-sectional view taken on line 6B—6B of FIG. 5.

FIG. 7 is an enlarged fragmentary cross-sectional view of another embodiment of the belt construction of this invention.

DESCRIPTION OF THE PREFERRED EMBODIMENTS

While the various features of this invention are hereinafter illustrated and described as providing power transmission belt constructions, such as a V-belt construction for a variable pulley drive, a toothed belt construction for timing or synchronous purposes, etc., it is to be understood that the various features of this invention can be utilized singly or in various combinations thereof to provide belt constructions for other purposes.

Therefore, this invention is not to be limited to only the embodiments illustrated in the drawings because the drawings are merely utilized to illustrate some of the wide variety of uses of this invention.

Referring now to FIGS. 1, 2, 3A and 3B, an improved endless power transmission belt construction of this invention is generally indicated by the reference numeral 20 and comprises an axial tensioning means 21 and a plurality of lateral stiffening means 22 carried by the axial tensioning means 21 and cooperating therewith to define power transmitting contact faces 23 on the opposed ends 24 and 25 of the stiffening means 22 and power transmitting contact faces 26 on the opposed ends 27 and 28 of the axial tensioning means 21. The belt construction 20 further comprises friction material 29 disposed in a relatively thin layer on the means 21 and 22 to fully encapsulate the same whereby the friction material 29 has a first portion thereof disposed on the end faces 23 of the stiffening means 22 and the edge faces 26 of the axial tensioning means 21 to define the power transmitting contact faces of the belt construction and the remaining portion of the friction material 29 at least assists in securing the friction material 29 to the means 21 and 22 whereby the axial tensioning emans 21 and stiffening means 22 define substantially a large amount of the material of the belt construction 20 and the friction material 29 defines a relatively small amount of the material of the belt construction 20.

The axial tensioning means 21 is illustrated as being an annular flat band and the stiffening means 22 are illustrated as being cylindrical in configuration. However, it is to be understood that the axial tensioning means 21 can have any desired and suitable cross-sectional configuration and the stiffening means 22 can likewise have any desired and suitable cross-sectional configuration, as well as varied cross-sectional configurations, the important feature being that the axial tensioning means 21 and lateral stiffening means 22 define a "backbone structure" for the belt construction 10.

In addition, the stiffening means 22 can be formed separate from the axial tensioning means 21 and be subsequently secured thereto in any desried manner or the axial tensioning means 21 and lateral stiffening means 22 can be formed together to provide a homogeneous and one-piece structure. For example, such one-piece structure can be provided by an injection molding operation in a manner well known in the art.

The axial tensioning means 21 and lateral stiffening means 22 of this invention are formed of any suitable material that provides an axial and lateral stiffness in excess of that normally provided by polymeric friction material that normally forms the main body of a belt construction that is reinforced with such a tensioning means and stiffening means. In this regard, it is believed that the means 21 and 22 can be formed of polymeric material, metal, etc. or combinations of material with the material of the axial tensioning means 21 being the same as or different than the material of the lateral stiffening means 22. For example, such combination of materials is disclosed in the aforementioned U.S. Pat. Nos. 4,078,443 and 4,108,012 to Warner et al, whereby these two patents are being incorporated into this disclosure by this reference thereto not only for a description of suitable materials, but also for the description of forming belt constructions by injection molding, etc., whereby the details of injection molding, etc., for forming the belt constructions of this invention need not be further discussed in this application.

The belt construction 20 of this invention is a V-belt construction as illustrated in FIGS. 3A and 3B as the end faces 23 of the lateral stiffening means 22 and end faces 26 of the axial tensioning means 21 are so shaped to define the substantially trapezoidal cross-sectional configuration illustrated in FIGS. 3A and 3B while the friction material 29 defines the power transmitting angled contact faces of the V-belt construction of FIGS. 3A and 3B. Because the axial tensioning means 21 and lateral stiffening means 22 extend to the angled sides 29' illustrated in FIGS. 3A and 3B, it is believed that the belt construction 20 could be utilized for continuously variable transmission purposes.

While the friction material 29 can comprise any suitable friction material, such as rubber, fabric, brake facing material, clutch facing material, etc., and combinations of such material, it is believed according to the teachings of this invention that because such friction material 29 is provided only in a relatively thin layer that is no thicker on the non-contact face portions of the means 21 and 22 than the relatively small thickness of the portion thereof at the contact faces of the belt construction 20 of this invention, hysteretic heat build up by the repeated flexing of the frictional material 29 during the use of the power transmission belt construction 20 is substantially minimized over the heat build up rate of conventional polymeric belt constructions under the same operating conditions.

Thus, it is believed that by providing the friction material 29 to form the main body part of the belt construction 20, as in the aforementioned U.S. Patents to Warner et al, would result in the friction material 29 providing too great of a heat build up through the continuous flexing of such friction material 29 as in the patents to Warner et al whereby it is believed that the patents to Warner et al did not appreciate the fact that the amount of friction material 29 can be held to an absolute minimum by disposing the same only in a relatively thin layer on the "backbone structure" of a composite belt construction so that the "backbone structure" itself forms the main body of the belt construction as provided by this invention.

It is to be understood that the friction material 29 can be disposed on the "backbone structure" 21, 22 in any suitable manner, such as by injection molding the material 29 onto the preformed "backbone structure" 21, 22, by merely dipping the preformed "backbone sturcture" in molten friction material, etc.

For example, it can be seen in FIG. 2 that a continuous length of the uncoated backbone structure 21, 22 can be run through or dipped through a bath 29' of the molten or liquid friction material 29 whereby the dipped backbone structure 21, 22 emerging from the left side of the bath 29' can have the coating 29 dried thereon as the coated length passes through the drying station 29'', the dipping operation causing the thickness of the first portion of the friction material 29 that is on the contact faces 23 and 26 to be relatively thin and the thickness of the remaining portion of the friction material 29 on the noncontact face portions of the means 21 and 22 to be no thicker than the thickness of the first portion thereof whereby a substantially large amount of the resulting belt construction 20 comprises the backbone structure and a relatively small amount of the belt construction 20 comprises the friction material 29.

If desired, a reinforcing cord or cords 30 can be helically wound during the injection molding of the axial tensioning means 21 to be completely encapsulated therein, the cord 30 being of any suitable material, such as a material normally forming the cords of power transmission belts or the like. For example, the cord or cords 30 can be provided in the same manner as set forth in the aformentioned U.S. Pat. No. 4,078,443 to Warner et al, at the same time that the axial tensioning means 21 is being injected molded with or without the stiffening means 22 being injection molded therewith as the case may be.

In any event, it can be seen that the axial tensioning means or band 21 prevents the helically wound cord or cords 30 from projecting out of the side edges 26 thereof as in conventional belt constructions which have edge cords coming out of the sides of such coverless belt constructions.

However, it is to be understood that it is believed that the material of the axial tensioning means 21 itself could provide the sole axial strength for the belt construction 20 with or without the encapsulated cord or cords 30 and could also encapsulate reinforcing fibers or other structure, as desired.

As previously stated, while the lateral stiffening means 22 can have any cross-sectional configuration, it can be seen in FIGS. 1 and 2 that the lateral stiffening means 22 respectively extend from the outside surface 31 of the axial tensioning means 21 as well as from the inside surface 32 thereof, the lateral stiffening means 22 that extend from the outside surface 31 of the axial tensioning means 21 being in radial alignment with the lateral stiffening means 22 that extend from the inside surface 32 thereof. However, it is to be understood that the lateral stiffening means 22 could extend from the axial tensioning means 21 in offset relation relative to the outside and inside surfaces 31 and 32 thereof as provided by the belt construction 20A illustrated in FIG. 4 or from only one side 31 or 32 of the axial tensioning means 21 as provided by the belt construction 20B of FIGS. 5 and 6. In addition, while the friction material 29 has been described and illustrated as completely encapsulating the "backbone structure" 21, 22, it is to be understood that the friction material can merely encapsulate part of the "backbone structure" 21, 22, such as only encapsulating all or part of just the stiffening means 22 in the manner provided by the belt construction 20C of FIG. 7.

Accordingly, the parts of the belt construction 20A, 20B and 20C that are similar to like parts of the belt construction 20 are indicated in the drawings by the same reference numerals followed by the respective reference letter "A", "B" or "C".

In particular, the belt construction 20A of FIG. 4 is substantially the same as the belt construction 20 of FIGS. 1 and 2 except that the lateral stiffening means 22A that extend outwardly from the side 31A of the belt construction 20A are disposed in offset radial relation to the axial stiffening means 22A that extend inwardly from the inside surface 32A of the axial tensioning means 21A as illustrated.

While the inside stiffening means 22A of the belt construction 20A are disposed medially between a pair of outside axial stiffeners 22A, it is to be understood that the inside stiffeners 22A could be arranged in any desired pattern relative to the pattern of the outside stiffeners 22A as desired.

In any event, the end faces 23A of the stiffeners 22A and the end faces 26A of the axial tensioning means 21A are provides with frictional material 29A so that the frictional material 29A is disposed on the power transmitting contact faces of the belt construction 20A for the reasons previously set forth in connection with the belt construction 20.

The belt construction 20B of this invention illustrated in FIGS. 5, 6A and 6B has the lateral stiffeners 22B extending only from the inside surface 32B of the axial tensioning means 21B and each stiffener 22B has a cross-sectional configuration that in this example is substantially trapezoidal to define a tooth having power transmitting contact faces 33 against which the frictional material 29B is secured, the friction material 29B completely encapsulating the "backbone structure" 21B, 22B in a thin layer thereof in the same manneras in the belt constructions 20 and 20A, so that the friction material 29B is not only disposed on the selected areas 33 of the belt construction 20B to define the contact faces 29B thereof, but also is disposed on the remainder of the "backbone structure" 21B, 22B to at least assist in securing the friction material 29B thereto. Thus, it can be seen that the belt construction 20B comprises a toothed belt which transmits its driving force through its teeth 22B engaging with suitable gear teeth-like structure in a manner well known in the art.

Therefore, it can be seen that by making the major portion of the teeth 22B out of stronger material than the friction material 29B and by making the teeth 22B integral with the band 21B in the manner previously described, it is believed that shearing of the teeth 22B is less likely than when the teeth of a belt construction are formed substantially entirely of friction material.

In regards to the belt construction 20C illustrated in FIG. 7, it can be seen that only the lateral stiffeners 22C thereof have the friction material 29C encapsulated thereon and, if desired, the stiffeners 22C can have opposed ends 24C and 25C (not shown) thereof extending beyond the side faces 26C of the axial tensioning means 21C so that the side faces 26C of the axial tensioning means 21C do not form any part of the power transmitting contact faces thereof whereby the friction material 29C is only disposed on the end faces 23C of the stiffening means 22C at the side edges of the belt construction 20C.

Therefore, it can be seen that each of the previously described and illustrated belt constructions 20, 20A, 20B, and 20C of this invention has power transmitting contact faces and comprises an axial tensioning means, a plurality of lateral stiffening means carried by the tensioning means, and friction material carried by such means, the tensioning means and the stiffening means being formed of material that provides an axial and lateral stiffness in excess of that normally provided by polymeric friction material that normally forms the main body of a belt construction that is reinforced with such a tensioning means and stiffening means. The friction material has a first portion thereof disposed on the means to define the contact faces thereof and has a remaining portion thereof disposed on the means to at least assist in securing the first portion to the means, the thickness of the first portion of the friction material being relatively thin and the thickness of the remaining portion being no thicker than the thickness of the first portion whereby a substantially large amount of the belt construction comprises the material of the means and a substantially small amount of the belt construction comprises the friction material.

Accordingly, it can be seen that this invention not only provides an improved endless power transmission belt construction, but also this invention provides a method of making such an improved endless power transmission belt construction.

While the forms and methods of this invention now preferred have been illustrated and described as required by the Patent Statute, it is to be understood that other forms and method steps can be utilized and still fall within the scope of the appended claims.

What is claimed is:

1. In a method of making an endless power transmission belt construction having power transmitting contact faces and comprising the steps of forming an axial tensioning means, forming a plurality of lateral stiffening means that are carried by said tensioning means whereby said tensioning means and said stiffening means comprise a self-contained unit, forming friction material that is carried by said stiffening means and said tensioning means, forming said tensioning means and said stiffening means from material that provides an axial and lateral stiffness for said belt construction and thereby provides a backbone structure for said belt construction with said backbone structure comprising said self-contained unit, and forming said friction material to have a first portion thereof disposed on said backbone structure to define said contact faces and have a remaining portion thereof disposed on said backbone structure to at least assist in securing said first portion to said backbone structure, the improvement wherein said steps of forming said friction material comprise the step of dipping said backbone structure as said self-contained unit thereof in said friction material while said friction material is in a liquid condition so as to form the thickness of said first portion of said friction material to be relatively thin and the thickness of said remaining portion to be no thicker than the thickness of said first portion whereby a substantially large amount of said belt construction comprises said backbone structure and a substantially small amount of said belt construction comprises said friction material.

2. A method of making a belt construction as set forth in claim 1 and including the step of forming said stiffening means and said tensioning means to be homogeneous and a one-piece construction.

3. A method of making a belt construction as set forth in claim 1 and including the steps of forming said stiffening means separate from said tensioning means, and thereafter securing said stiffening means to said tensioning means.

4. A method of making a belt construction as set forth in claim 1 and forming said contact faces to define a trapezoidal cross-sectional configuration of said belt construction.

5. A method of making a belt construction as set forth in claim 1 and including the steps of forming said stiffening means to define teeth for said belt construction, and forming said contact faces to comprise driving faces of said teeth whereby said belt construction is a toothed belt construction.

6. A method of making a belt construction as set forth in claim 1 and including the steps of forming said tensioning means to have an inside surface and an outside surface, and extending said stiffening means from at least one of said surfaces.

7. A method of making a belt construction as set forth in claim 6 and including the steps of forming said tensioning means to comprise an annular band having opposed side edges, and extending each said stiffening means substantially to said opposed side edges of said tensioning means.

8. A method of making a belt construction as set forth in claim 6 and including the step of extending said stiffening means from each said surface of said tensioning means so that said stiffening means extending from said outer surface are substantially in radial alignment with said stiffening means that extend from said inside surface.

9. A method of making a belt construction as set forth in claim 6 and including the step of extending said stiffening means from each said surface of said tensioning means so that said stiffening means extending from said outer surface are radially offset relative to said stiffening means that extend from said inside surface.

10. A method of making a belt construction as set forth in claim 6 and including the step of axially spacing said stiffening means from each other along the longitudinal axis of said tensioning means.

11. A method of making a belt construction as set forth in claim 1 and including the step of forming said friction material to include polymeric material.

12. In an endless power transmission belt construction having power transmitting contact faces and comprising an axial tensioning means, a plurality of lateral stiffening means carried by said tensioning means whereby said tensioning means and said stiffening means comprise a self-contained unit, and friction material carried by said stiffening means and said tensioning means, said tensioning means and said stiffening means being formed from material that provides an axial and lateral stiffness for said belt construction and thereby provides a backbone structure for said belt construction with said backbone structure comprising said self-contained unit, said friction material having a first portion thereof disposed on said backbone structure to define said contact faces and having a remaining portion thereof disposed on said backbone structure to at least assist in securing said first portion to said backbone structure, the improvement wherein said backbone structure as said self-contained unit thereof had been dipped into said friction material while said friction material is in a liquid condition so as to have the thickness of said first portion of said friction material to be relatively thin and the thickness of said remaining portion to be no thicker than the thickness of said first portion whereby a substantially large amount of said belt construction comprises said backbone structure and a substantially small amount of said belt construction comprises said friction material.

13. A belt construction as set forth in claim 12 wherein said stiffening means and said tensioning means are homogeneous and a one-piece construction.

14. A belt construction as set forth in claim 12 wherein said stiffening means initially were separate from said tensioning means and are secured thereto.

15. A belt construction as set forth in claim 12 wherein said contact faces define a trapezoidal cross-sectional configuration of said belt construction whereby said belt construction is a V-belt construction.

16. A belt construction as set forth in claim 12 wherein said stiffening means define teeth for said belt construction and said contact faces comprise driving faces of said teeth whereby said belt construction is a toothed belt construction.

17. A belt construction as set forth in claim 12 wherein said tensioning means has an inside surface and an outside surface, said stiffening means extending from at least one of said surfaces.

18. A belt construction as set forth in claim 17 wherein said tensioning means comprises an annular band having opposed side edges, each said stiffening means extending substantially to said opposed side edges of said tensioning means.

19. A belt construction as set forth in claim 17 wherein said stiffening means extend from each said surface of said tensioning means, said stiffening means extending from said outer surface being substantially in radial alignment with said stiffening means that extend from said inside surface.

20. A belt construction as set forth in claim 17 wherein said stiffening means extend from each said surface of said tensioning means, said stiffening means extending from said outer surface being radially offset relative to said stiffening means that extend from said inside surface.

21. A belt construction as set forth in claim 17 wherein said stiffening means are axially spaced from each other along the longitudinal axis of said tensioning means.

22. A belt construction as set forth in claim 12 wherein said friction material includes polymeric material.

* * * * *